Patented Aug. 11, 1931

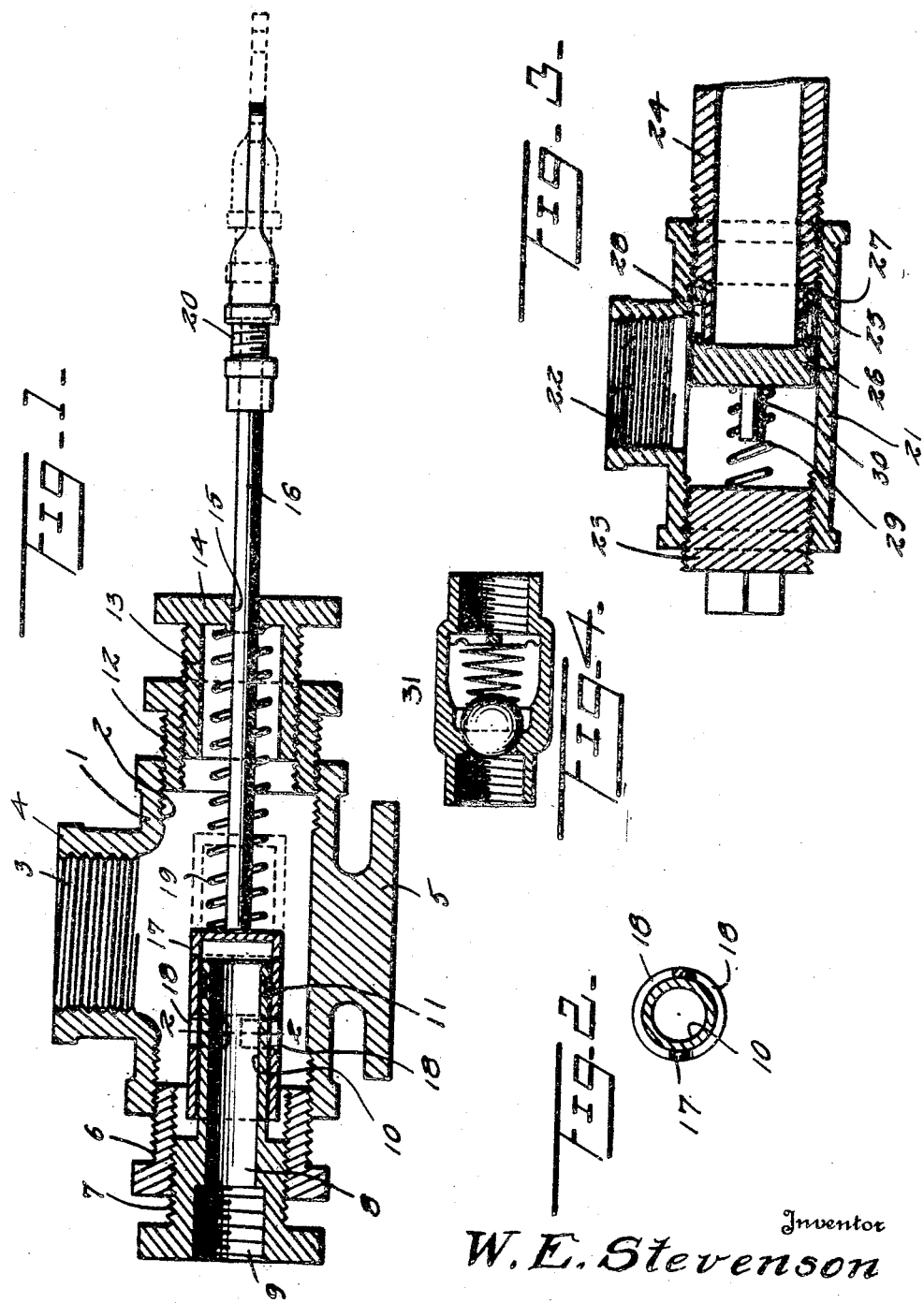

1,818,171

UNITED STATES PATENT OFFICE

WILLIAM E. STEVENSON, OF PITTSBURGH, PENNSYLVANIA

PUMP

Application filed May 18, 1929. Serial No. 364,076.

This invention relates to the class of motors and pertains particularly to a motor of new and novel design to be operated by compressed air.

The primary object of the present invention is to provide a motor to be operated by compressed air or other fluid wherein the piston and valve element constitute the same structure.

Another object of the invention is to provide a motor designed to be operated by a compressed fluid in which the pressure of the fluid against a piston will be automatically exhausted through the piston after the same has travelled to a predetermined position.

Still another object of the invention is to provide a motor which may be reversely operated for the performance of pumping operations.

The invention will be best understood from a consideration of the following detailed description taken in connection with the accompanying drawings forming a part of the present invention with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a central longitudinal view through the motor embodying the present invention.

Figure 2 is a sectional view taken upon the line 2—2 of Figure 1.

Figure 3 is a longitudinal sectional view through a modified form of the motor structure.

Figure 4 is a longitudinal section of a conventional check valve 31 which is adapted for use in connection with this device to be placed in passage 8.

Referring to the drawings in detail wherein like numerals of reference indicate corresponding parts throughout the several views, the numeral 1 indicates a horizontally mounted cylinder each end of which is opened and interiorly threaded as at 2, through the wall of which a lateral port 3 opens through an interiorly threaded collar 4. A suitable base 5 is provided for supporting the cylinder in proper position.

In one end of the cylinder there is threadably secured a reducing coupling 6 in which coupling is threadably mounted a nipple 7 through the central portion of which is formed a passage 8, the outer end of this passage being enlarged and threaded as indicated at 9. The nipple 7 is designed to have connected, in the enlarged end of the passage therethrough, a suitable compressed air pipe (not shown) for the injection of the operating fluid into the motor.

At its inner end there is extended from the nipple a cylinder 10 which terminates in the central part of the main cylinder body 1, as shown. This inner cylinder 10 is provided with one or more packing rings 11 about the outer face thereof for the purpose hereinafter more fully described.

In the other end of the main cylinder 1 is removably positioned a reducing coupling 12 and secured in this coupling is a piston rod guide nipple 13, the outer end of which is provided with a head 14 through the central portion of which a passage 15 is formed.

Slidably extended through the passage 15 of the nipple 13 is a piston rod 16, the inner end of which carries a cylindrical piston body 17, the forward end of which is open, as shown, to receive the inner cylinder, in the manner shown.

The wall of the piston 17 is provided with a pair of vertically extending ports 18 which under normal conditions are closed by the cylinder 10, the piston being normally urged forwardly upon the cylinder 10 by a coiled spring 19 which surrounds the piston rod within the pump, one end of this spring bearing against the rear end of the piston while the other end bears against the nipple 13 through which the piston rod extends.

As is clearly shown in Figure 1, the packing ring 11 carried by the cylinder 10 bears against the inner wall of the piston 17, thus preventing the escape of air between the contacting faces of the piston and the cylinder 10.

In the operation of this motor air or other suitable fluid under pressure is injected through the passage 8 against the inner end of the piston 17 forcing the piston and piston rod off of the cylinder 10 against the tension of the spring 19. As soon as the ports 18 reach the end of the cylinder 10, they will, of course, be opened and the pressure of the fluid acting upon the piston will be exhausted therethrough to escape through the port 3. The spring 19 will then act to return the piston to its former position, closing the ports 18, after which the compressed fluid will again act in the manner previously described. This action will be repeated as long as the compressed fluid is injected into the motor through the passage 8.

The outer end of the piston rod 16 is provided with a suitable means for coupling it with a crank or other mechanism, this means being adjustable lengthwise of the piston rod as indicated at 20.

It will be readily seen that the operation above described may be reversed for the employment of the motor as a pump in which case the fluid will be introduced through the port 3 and as the piston rod 16 is reciprocated the fluid will enter the cylinder piston through the ports 18 as the same are uncovered and will be trapped therein upon the forward movement of the piston and escape through the passage 8.

In Figure 3, a modified form of the structure shown in Figure 1 is illustrated, showing the manner in which the structure of the pump by a slight modification may be employed as an exhaust valve. In this modification the cylinder which will here be indicated as a whole by the numeral 21 has the lateral port 22 open for use as an exhaust port as described in connection with the pump structure and has one end closed by a plug 23. In the opposite end of the cylinder may be engaged one end of a pipe 24, the inner end of which is reduced as at 25, this reduced end being positioned within the cylinder, as shown.

Positioned over the reduced end 25 of the pipe 24 is a cap 26, through the skirt portion 27 of which is formed a plurality, preferably four, of outlet ports 28. These ports are normally closed by the wall of the reduced portion 25 and the cap is normally held tightly over the inner end of the pipe 24 by a coiled spring 29, one end of which bears against the plug 23 while the other end receives a post or pin 30 carried by the head of the cap 26 and bears against this head in the manner shown.

It will thus be seen that the principle of the pump structure described and shown in Figure 1 may be employed to provide an exhaust valve which is normally closed and is actuated by the pressure of fluid passing through the pipe 24 and striking the cap 26 to force the same from position on the reduced portion of the pipe until the ports 28 thereof are opened to permit the fluid pressure to be dissipated, following which, the spring 29 will act to close the end of the pipe by returning the cap 26 to the position shown.

Having thus described my invention, what I claim is:—

1. A device of the character described, comprising a casing, a cylinder mounted within the casing and having the inner end thereof open, an apertured sleeve slidably engaging said cylinder, said sleeve having one end thereof closed, a rod secured to the closed end of the sleeve, means for holding said rod concentrically of said cylinder, and a spring loosely positioned about said rod and engaging the closed end of said sleeve whereby to constantly urge said sleeve in one direction.

2. A device of the character described, comprising a casing, a cylinder mounted within the casing and having the inner end thereof open, an apertured sleeve slidably engaging the cylinder, a packing member carried by the cylinder and engaging the sleeve, and tensioned resilient means mounted within the casing and engaging the inner end of the sleeve for constantly urging the sleeve in one direction.

In testimony whereof I hereunto affix my signature.

WILLIAM E. STEVENSON.